United States Patent [19]

Iwasaki et al.

[11] Patent Number: 4,814,666

[45] Date of Patent: Mar. 21, 1989

[54] ELECTRON-BEAM EXISTED DISPLAY TUBE, THE SCREEN OF WHICH HAS A FLUORESCENT COMPONENT OF A EU CONTAINING RED FLUORESCENT COMPONENT AND A BLUE OR GREEN FLUORESCENT COMPONENT

[75] Inventors: Kazuhito Iwasaki; Hideo Tono; Susumu Omatoi, all of Kanagawa, Japan

[73] Assignee: Kasei Optonix, Ltd., Tokyo, Japan

[21] Appl. No.: 34,393

[22] PCT Filed: Jul. 15, 1986

[86] PCT No.: PCT/JP86/00362

§ 371 Date: Mar. 9, 1987

§ 102(e) Date: Mar. 9, 1987

[87] PCT Pub. No.: WO87/00545

PCT Pub. Date: Jan. 29, 1987

[30] Foreign Application Priority Data

Jul. 15, 1985 [JP] Japan ............................ 60-107896[U]
Jul. 15, 1985 [JP] Japan ............................ 60-107898[U]

[51] Int. Cl.$^4$ ............................................. H01J 29/20
[52] U.S. Cl. ............................. 313/468; 252/301.6 R; 252/301.65
[58] Field of Search ............................. 313/467, 468; 252/301.6 R, 301.65

[56] References Cited

U.S. PATENT DOCUMENTS 3,922,233 11/1975 Torii et al. ..................... 252/301.65
4,151,442 4/1979 Koga et al. .......................... 313/467
4,651,054 3/1987 Itou et al. ............................. 313/468

OTHER PUBLICATIONS

Kirk-Othmer, Encyclopedia of Chemical Technology, 3rd ed., vol. 6, pp. 535 and 539, John Wiley & Sons, NY, 1979.

Primary Examiner—David K. Moore
Assistant Examiner—K. Wieder
Attorney, Agent, or Firm—Oblon, Fisher, Spivak, McClelland & Maier

[57] ABSTRACT

The present invention relates to an electron-beam excited display tube useful in such a display apparatus as a color cathode-ray tube. In accordance with the present invention, the content of europium as a activator for a rare earth oxysulfide fluorescent material used as the red emission component is within the range of 0.05 to 2.0 mol %, thereby providing a very bright and low cost electron-beam excited display tube without any uneven color reproduction, even when the display screen is seen from very close quarters.

9 Claims, 4 Drawing Sheets

ELECTRON-BEAM EXISTED DISPLAY TUBE, THE SCREEN OF WHICH HAS A FLUORESCENT COMPONENT OF A EU CONTAINING RED FLUORESCENT COMPONENT AND A BLUE OR GREEN FLUORESCENT COMPONENT

TECHNICAL FIELD

The present invention relates generally to an electron-beam excited display tube, and more specifically to an electron-beam excited display tube having a low cost and very bright fluorescent screen without any uneven reproduction of color.

BACKGROUND ART

It has heretofore been known that a fluorescent layer comprising a mixture of a red emission fluorescent substance with a green or blue emission fluorescent substance, provides various emission colors depending on their mixing ratio. In particular, electron-beam excited display tubes such as color and monochrome cathode-ray tubes and low velocity electron excited fluorescent display tubes can display images and characters very minutely as the qualities of computer terminals or televisions are highly improved. Consequently, as a viewer has more chances of closely seeing the screen of the display tube, significant disadvantages which have previously been ignored, have come in the limelight. The typical disadvantage among them is a problem of color unevenness. Specifically, when the emission screen made up of the fluorescent mixture including the above two or three components is observed from a certain distance, the screen color looks like a single particular color. However, as the viewer approaches the fluorescent screen, the screen color looks like the color of each individual fluorescent substance, and this is visually recognized as color unevenness. In particular, since generally human vision is strongly sensitive to change in red color, this phenomenon causes human being to visually recognize red unevenness and makes the screen unsightly. Hence, there has been a strong desire to eliminate this disadvantage.

Recently, in order to lower the transmittance of a faceplate so as to relieve the eye fatigue from the viewpoint of human engineering, there has been demanded development of a display tube having a brightness superior to that of prior art. On the other hand, as rare earth elements have been increasingly used as materials in various technical fields, their prices have greatly increased, which leads to an increase in the prices of fluorescent substance containing rare earth elements. Therefore, reduction of those prices has been also demanded.

Accordingly, the object of the present invention is to provide an electron-beam excited display tube having a very high brightness and low cost fluorescent screen without any color unevenness.

The present inventors have made intensive investigations and have found out that the above object can be successfully achieved by using, as a fluorescent layer, a binary or ternary fluorescent mixture comprising (1) a red emission component composed of a europium-activated rare earth oxysulfide having a europium concentration (hereinafter referred to simply as "Eu concentration") of 0.05 to 2.0 mol %; and (2) a green or blue emission component having a particular chromaticity point. The present invention has been accomplished based on this finding.

This invention is quite unexpected and remarkable because it has heretofore been thought in this technical field that an Eu concentration of lower than 2 mol % is not suitable from the viewpoint of color and brightness according to Denki Gakkai (the Institute of Electrical Engineers of Japan), the data provided by Denshi Sochi (Electronic Device) Research Group, Data No. EDD 75-13 to 23 "Transition strength of $Eu^{3+}$ from $^5D_0$, $^5D_1$ and the chromaticity of $Y_2O_2S$:Eu fluorescent material" February, 1975.

DISCLOSURE OF THE INVENTION

The present invention provides an electron-beam excited display tube having, as a fluorescent layer, a fluorescent mixture comprising: a red emission component composed of a rare earth oxysulfide fluorescent material including Eu as a main activator at an Eu concentration of 0.05 to 2.0 mol % (the rare earth element is at least one selected from the group consisting of yttrium, gadolinium, lanthanum and lutetium); and a green emission component having a chromaticity area (X/Y) surrounded by the points (0.19/0.76), (0.19/0.45), (0.24/0.41) and (0.39/0.60) in the CIE color specification system, or a blue emission component having a chromaticity area (X/Y) surrounded by the points (0.14/0.045), (0.14/0.19), (0.18/0.025) and (0.18/0.19) in the CIE color specification system.

The electron-beam excited display tube accomplished by this layer construction provides a very bright fluorescent screen without any color unevenness, and yet capable of being manufactured at low cost.

BEST MODE FOR CARRYING OUT THE INVENTION

Figure 1:
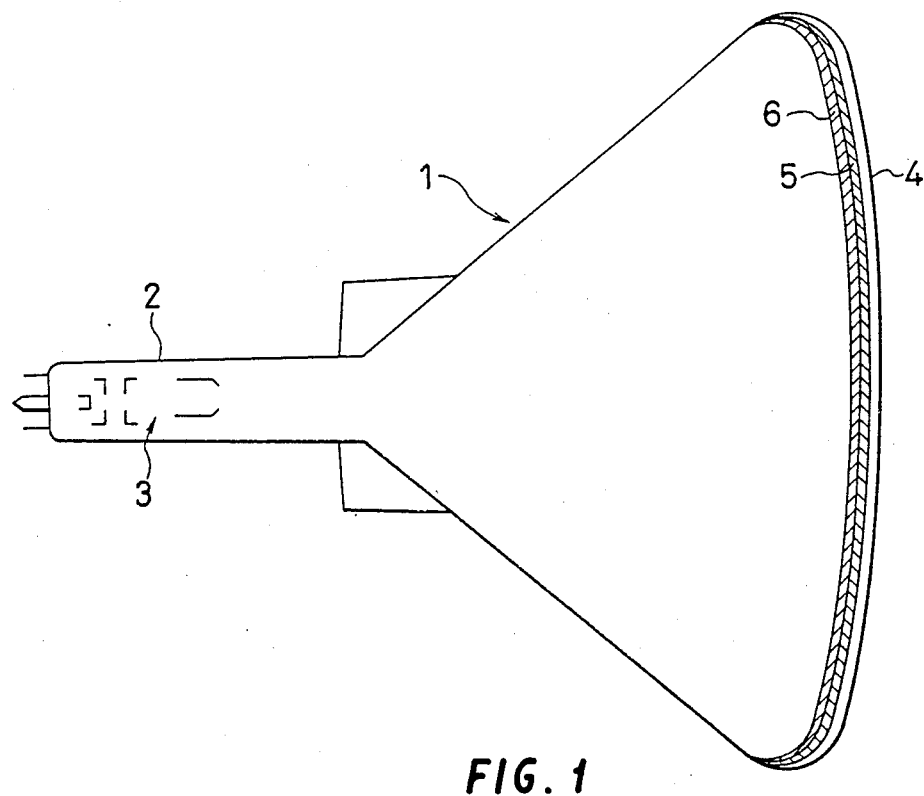
FIG. 1 is a diagrammatic view of a preferred embodiment of a monochrome-type electron-beam excited display tube in accordance with the present invention.

A present preferred electron-beam excited display tube shown in FIG. 1 has substantially the same construction as a prior art monochrome-type cathode-ray tube, except the components of the fluorescent layer. As shown in FIG. 1, the illustrated electron-beam excited display tube has an electron gun assembly 3 in a neck portion 2 of a funnel 1, and a fluorescent layer 5 is formed on the entire inner surface of a faceplate 4 being opposed to the electron gun assembly 3. In general, an aluminum deposition film 6 is formed on the back of the fluorescent layer 5 in order to prevent the fluorescent layer from being charged up during excitation.

The fluorescent layer 5 is made of a fluorescent mixture consisting of: a red emission component composed of a rare earth oxysulfide fluorescent material including Eu as a main activator at an Eu concentration of 0.05 to 2.0 mol %; and a green emission component having a chromaticity area (X/Y) surrounded by the points (0.19/0.76), (0.19/0.45), (0.24/0.41) and (0.39/0.60) in the CIE color specification system; or a blue emission component having a chromaticity area (X/Y) surrounded by the points (0.14/0.045), (0.14/0.19), (0.18/0.025) and (0.18/0.19) in the CIE color specification system. In the case of a ternary fluorescent mixture, it is preferable that a blue emission color is surrounded by four chromaticity points, for example (0.33/0.63), (0.61/0.36), (0.15/0.17) and (0.18/0.04).

The above-mentioned rare earth oxysulfide fluorescent material including Eu as a main activator has a basic chemical composition formula which is generally described as $Ln_2O_2S:Eu$ (wherein Ln is at least one selected from the group consisting of Y, Gd, La and Lu). As is well known, this fluorescent material covers those having the same basic characteristics as the $Ln_2O_2S:Eu$ fluorescent material such as those containing Eu which is partially replaced by Sm; a sensitizer as a coactivator such as Tb, Pr and Mg; and Ln which is partially replaced by another element or elements. The aforementioned fluorescent materials are hereinafter referred to simply as "$Ln_2O_2S:Eu$ fluorescent material". Incidentally, the above-described red fluorescent component may contain, other known red fluorescent component for the purpose of color correction, if required.

As the above-described green or blue fluorescent material, any types of fluorescent material having a chromaticity point within the same range as mentioned previously may be used without posing any problem. As an example, the green emission component covers a zinc sulfide fluorescent material including copper as a main activator [ZnS:Cu/Al, ZnS:Cu/Au/Al, (Zn/Cd)S:Cu/Al]; a $Zn_2SiO_4:Mn$ fluorescent material; a ZnS:Ag/Cu fluorescent material; a $Gd_2O_2S:Tb$ fluorescent material; an $La_2O_2S:Tb$ fluorescent material; a $Y_3(Al/Ga)_5O_{12}:Ce$ fluorescent material; a $Y_3Al_5O_{12}:Tb$ fluorescent material; and a $Y_2O_2S:Tb$ fluorescent material. In particular, the zinc sulfide fluorescent material including copper as a main activator is the most suitable among them.

The blue emission component includes: a zinc sulfide fluorescent material including silver as a main activator, such as ZnS:Ag, ZNS:AG/Mg, ZnS:Ag/Ga; a $Y_2SiO_5:Ce$ fluorescent material; and a $CaWO_4$ fluorescent material.

Figure 2:
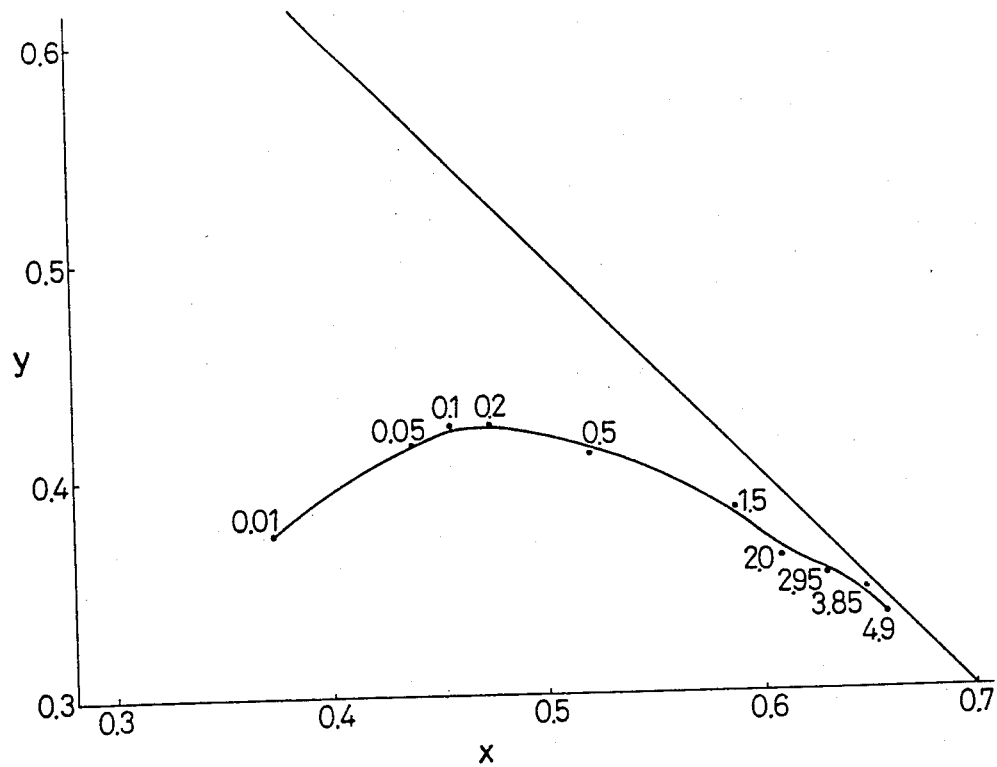
FIG. 2 is a graph showing the relationship between the Eu concentration and chromaticity points of a red emission component.

As shown in FIG. 2, the red component of $Ln_2O_2S:Eu$ having an Eu concentration of 0.05 to 2.0 mol % emits yellowish orange or orange having a chromaticity point (X/Y) being (0.438/0.414) to (0.610/0.360), as compared with the red emitted by the conventional $Y_2O_2S:Eu$ fluorescent material having an Eu concentration of 3.6 mol % and a chromaticity point (0.640/0.352). FIG. 2 is a graph illustratively showing a series of the chromaticity points of the $Ln_2O_2S:Eu$ fluorescent material, wherein Ln is Y. Other fluorescent materials using Gd, La and Lu have substantially the same chromaticity points as shown in FIG. 2. Therefore, since the present red component has a pale red, no red unevenness can be visually recognized even from a close distance when it is made into the above-described fluorescent mixture.

In order to achieve the same emission color as that of the prior art (Eu concentration: 3.6 mol %) by using the present $Ln_2O_2S:Eu$ fluorescent material having an Eu concentration of 0.05 to 2.0 mol %, it seems that the amount of the fluorescent material to be used should be increased, as compared with that of the prior art $Y_2O_2S:Eu$ fluorescent material, so that the present fluorescent mixture is more expensive than that of the prior art. However, since it is possible to reduce the amount of the most expensive Eu to be used, the price can totally be reduced by as much as about 20 to 40%. Also, the use of the present fluorescent mixture improves the brightness of the screen by as much as several % as compared with that of the prior art fluorescent mixture. The present invention provides a remarkably good effect when the $Ln_2O_2S:Eu$ fluorescent material having an Eu concentration of 0.05 to 1.5 mol % is used. In particular, it is preferable that the Eu concentration is within the range of 0.1 to 1.0 mol %. In addition, as a preferred combination of the fluorescent materials, a zinc sulfide fluorescent material including copper as a main activator is used as the green emission component, and a zinc sulfide fluorescent material including silver as a main activator is used as the blue emission component.

Moreover, the present invention provides a remarkable effect when the present $Ln_2O_2S:Eu$ fluorescent material having the above-specified Eu concentration is combined with the green component in such a manner that the emission color (X/Y) is surrounded by the points (0.39/0.60) and (0.33/0.52).

Another preferred embodiment of the present invention will be described in more detail below.

Figure 3:
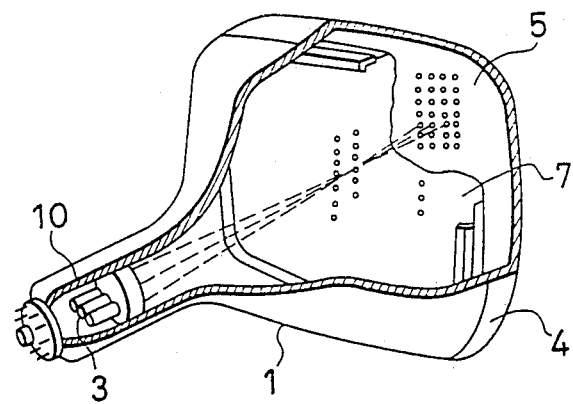
FIG. 3 is a partially cutaway and perspective view diagrammatically showing another preferred embodiment of an electron-beam excited color display tube in accordance with the present invention.
Figure 4:
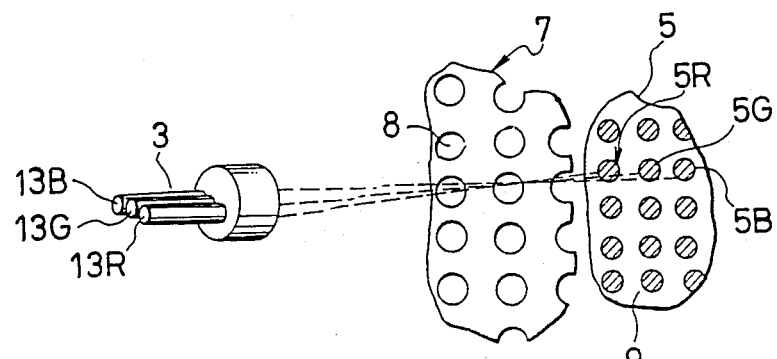
FIG. 4 is a diagrammatic view showing on enlarged scale a portion of the color display tube of FIG. 3.

In FIGS. 3 and 4, there is illustrated an electron-beam excited color display tube of the type which uses the present above-described fluorescent mixture as a blue emission element. Except the fluorescent elements, the illustrated color display tube has substantially the same structure as that of a shadow mask-type cathode-ray tube having three electron guns which is widely used for a cathode-ray tube for a color television.

As shown in FIG. 3, a fluorescent layer 5 is provided on the inner surface of a glass faceplate 4 constituting the front side of a glass envelope 1. As shown in FIG. 4, the fluorescent layer 5 includes fluorescent elements 5G for green emission, fluorescent elements 5B for blue emission and fluorescent elements 5R for red emission, each element being in a spot form. These fluorescent elements are regularly spaced apart from one another at predetermined intervals. The remaining spaces between the fluorescent elements are constituted of a light-absorbing substance 9.

The blue fluorescent elements 5B are made of the present fluorescent mixture as described above, and provide the so-called light blue emission color having a chromaticity area (X/Y) surrounded by the points (0.20/0.25), (0.21/0.20), (0.30/0.375) and (0.35/0.325).

The remaining green and red fluorescent elements 5G and 5R are made from known fluorescent materials. As an example, a ZnS:Cu/Al or ZnS:Cu/Au/Al fluorescent material may be used as the green fluorescent elements 5G, and a $Y_2O_2S:Eu$, $Y_2O_3:Eu$, or $YVO_4:Eu$ fluorescent material may be used as the red fluorescent elements 5R.

The electron gun assembly 3 is provided within a cylindrical portion 10 of the glass funnel of the glass envelope 1 so that the gun assembly 3 is opposed to the fluorescent layer 5 formed on the inner surface of the glass faceplate 4. The electron gun assembly 3 is constituted of a set of guns comprising an electron gun 13G for the green fluorescent elements 5G, an electron gun 13B for the blue fluorescent elements 5B and an electron gun 13R for the red fluorescent elements 5R. The electron beams radiated by the electron guns 13G, 13B and 13R selectively excite the corresponding fluorescent elements 5G, 5B and 5R, respectively.

A shadow mask 7 is interposed between the fluorescent layer 5 and the electron gun assembly 3, and has a multiplicity of spot-like holes 8 which are arranged regularly. Each of the holes 8 corresponds to a set of three fluorescent elements 5G, 5B and 5R. The shadow mask 7 is positioned at a predetermined location between the fluorescent layer 5 and the electron gun assembly 3 so that each of the electron beams radiated by the electron guns 13G, 13B and 13R passes through the corresponding hole 8 of the shadow mask 7 at an angle slightly different from one another, thereby selectively exciting the fluorescent elements 5G, 5B and 5R. Therefore, all the green fluorescent elements 5G, all the blue fluorescent elements 5B, and all the red fluorescent elements 5R are excited by the electron beams radiated by the electron guns 13G, 13B and 13R, respectively.

Because the red emission component used in the blue emission element emits a pale red in the above-described electron-beam excited color display tube, no red unevenness was not visually recognized even from very close quarters.

As described previously, the cost of the present fluorescent layer can be greatly reduced when the Eu concentration is 0.05 to 0.2 mol %, as compared with when an $Ln_2O_2S$:Eu phosphor having a know Eu concentration (3.6 mol %) is employed. When the Eu concentration is less than 0.05 mol %, a large amount of $Ln_2O_2S$:Eu fluorescent material must be mixed in order to obtain the same level of light blue emission color, resulting in an increase in the cost of materials. Conversely, when the Eu concentration exceeds 2.0 mol %, the amount of $Ln_2O_2S$:Eu fluorescent material to be used is reduced, but the amount of the most expensive Eu to be used needs to be relatively increased, thus resulting in an increase in the cost of materials. Therefore, neither of these cases is preferred. From this viewpoint, it is preferable that Eu concentration ranges from 0.05 to 1.5 mol %, particularly 0.1 to 1 mol %.

Figure 5:
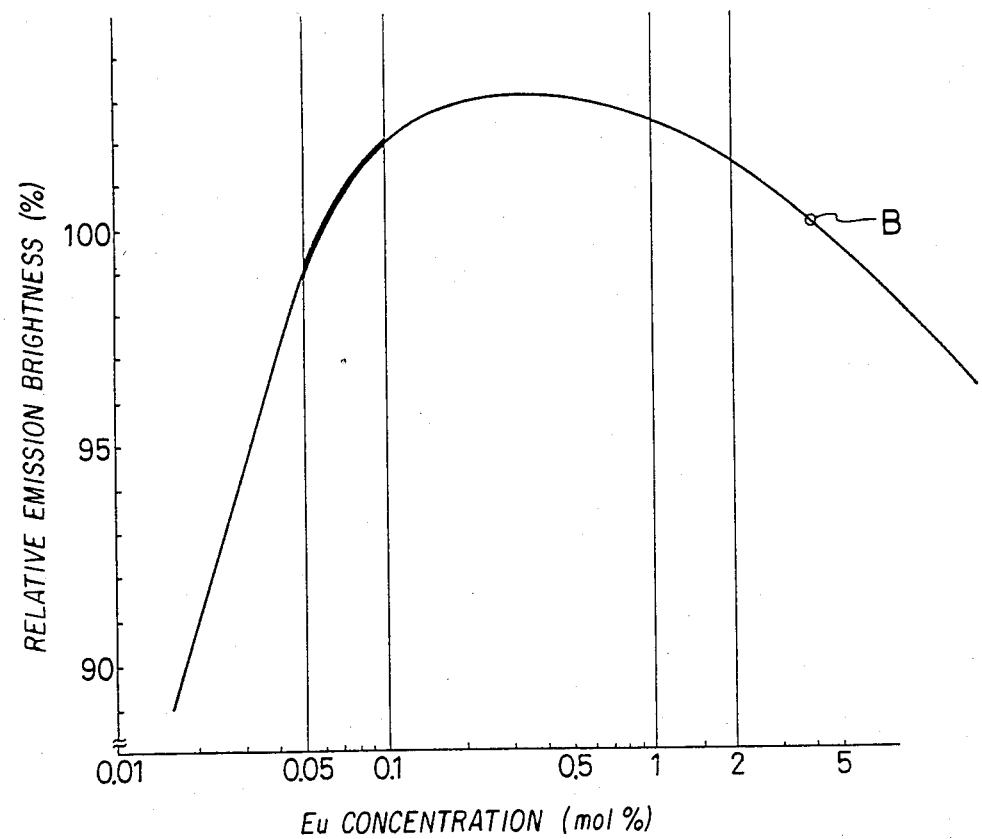
FIG. 5 is a graph showing the relationship between the Eu concentration and relative emission brightness.

FIG. 5 is a graph showing the relationship between Eu concentration and relative emission brightness as provided when a fluorescent mixture for light blue emission is used as the blue emission elements under the above-described conditions. As is clear from FIG. 5, brightness is improved when Eu concentration is 0.07 to 2.0 mol %, as compared with the use of an $Ln_2O_2S$:Eu fluorescent material having a known Eu concentration (3.6 mol %) which is plotted by a point B. In particular, it is preferable that Eu concentration is 0.1 to 1.5 mol % from the viewpoint of brightness.

The present invention will be described in more detail with reference to the following examples.

EXAMPLE 1

78 weight parts of a $Y_2O_2S$:Eu fluorescent material having an Eu concentration of 0.75 mol % was combined with 22 weight parts of a ZnS:Cu/Al fluorescent material exhibiting an emission color (0.282/0.620), and the resultant fluorescent mixture was used as a fluorescent layer, to prepare an electron-beam excited display tube for a monochrome type which had a yellowish-green emission color (0.40/0.52) and the structure shown in FIG. 1. According to this tube, the color unevenness was not visually recognized, brightness was improved by 6% and the cost of materials was reduced by 27%, as compared with a display tube of a type which had a known $Y_2O_2S$:Eu fluorescent material having an Eu concentration of 3.6 mol % and which reproduced the same emission color (0.40/0.52) as the present tube.

EXAMPLE 2

70 weight parts of a $Y_2O_2S$:Eu fluorescent material having an Eu concentration of 2 mol % was combined with 30 weight parts of a ZnS:Cu/Al fluorescent material exhibiting an emission color (0.282/0.620), and the resultant fluorescent mixture was used as a fluorescent layer, thereby preparing an electron-beam excited display tube for a monochrome-type which had a yellowish-green emission color (0.40/0.52) and the structure shown in FIG. 1. According to this tube, the color unevenness was hardly visually recognized, brightness was improved by 10% and the cost of materials was reduced by 16%, as compared with a display tube of a type which had a known $Y_2O_2S$:Eu fluorescent material having an Eu concentration of 3.6 mol % and which reproduced the same emission color (0.40/0.52) as the present tube.

EXAMPLE 3

A fluorescent mixture for a fluorescent layer was prepared by a combination of: 39 weight parts of a $Y_2O_2S$:Eu fluorescent material having an Eu concentration of 0.75 mol %; 42.5 weight parts of a $Zn_3(PO_4)_2$:Mn fluorescent material (P27) exhibiting an emission color (0.655/0.343); 7.5 weight parts of a $Zn_2SiO_4$:Mn fluorescent material (P39) having an emission color (0.205/0.714); and 11 weight parts of a ZnS:Cu/Al fluorescent material exhibiting an emission color (0.282/0.620). By using this fluorescent mixture, an electron-beam excited display tube for a monochrome type was prepared, which tube had a medium persistent orange (0.56/0.41) and the structure shown in FIG. 1. According to this tube, the color unevenness was reduced to a small level, brightness was improved by 35% and the cost of materials was reduced by 35%, as compared with a display tube of a type which had a known $Y_2O_2S$:Eu fluorescent material having an Eu concentration of 3.6 mol % and which reproduced the same emission color (0.56/0.41) as the present tube.

EXAMPLE 4

A fluorescent mixture for a fluorescent layer was obtained by a combination of: 48 weight parts of a $Y_2O_2S$:Eu fluorescent material having an Eu concentration of 2 mol %; 42.5 weight parts of a $Zn_3(PO_4)_2$:Mn fluorescent material (P27) exhibiting an emission color (0.655/0.343); 7.5 weight parts of a $Zn_2SiO_4$:Mn fluorescent material (P39) exhibiting an emission color (0.205/0.714); and 2 weight parts of a ZnS:Cu/Al fluorescent material exhibiting an emission color (0.282/0.620). By using this fluorescent mixture, an electron-beam excited display tube for a monochrome type was prepared, which tube had a medium persistent orange (0.56/0.41) and the structure shown in FIG. 1. According to this tube, the color unevenness was reduced to a small lever, brightness was improved by 12% and the cost of materials was reduced by 14%, as compared with a display tube of a type which had a known $Y_2O_2S$:Eu fluorescent material having an Eu concentration of 3.6 mol % and which reproduced the same emission color (0.56/0.41) as the present tube.

EXAMPLE 5

A fluorescent mixture for a fluorescent layer was prepared by a combination of: 28 weight parts of a $Y_2O_2S$:Eu fluorescent material having an Eu concentration of 0.75 mol %; 45 weight parts of a ZnS:Ag fluorescent material exhibiting an emission color (0.147/0.060); and 27 weight parts of a ZnS:Cu/Al fluorescent material exhibiting an emission color (0.282/0.620). By using this fluorescent mixture, an electron-beam excited color display tube was prepared, which tube had blue emission elements having an emission color (0.217/0.225: light blue). According to this tube, the color unevenness was not visually recognized, brightness was improved by 3%, and the cost of materials was reduced by 34%, as compared with a display tube of a type which had a known $Y_2O_2S$:Eu fluorescent material having an Eu concentration of 3.6 mol % and which reproduced the same emission color (0.217/0.225) as the present tube.

EXAMPLE 6

Except that a $Y_2O_2S$:Eu fluorescent material having an Eu concentration of 0.5 mol % is used, a color cathode-ray tube having blue emission elements was prepared in the same manner as that of Example 5. According to this tube, the color unevenness was not visually recognized, brightness was improved by 3%, and the cost of materials was reduced by 36%, as compared with the prior art elements.

EXAMPLE 7

A fluorescent mixture for a fluorescent layer was prepared by a combination of: 31 weight parts of a $Y_2O_2S$:Eu fluorescent material having an Eu concentration of 0.2 mol %; 49 weight parts of a ZnS:Ag fluorescent material exhibiting an emission color (0.147/0.060); and 20 weight parts of a $Zn_S$: Cu/Al fluorescent material exhibiting an emission color (0.282/0.620). By using this fluorescent mixture, a color cathode-ray tube was prepared, which tube had fluorescent elements for blue emission (light blue) suited for use in a color cathode-ray tube. According to this tube, the color unevenness was not visually recognized, brightness was improved by 3%, and the cost of materials was reduced by 30%, as compared with prior art blue emission elements which had a $Y_2O_2S$:Eu fluorescent material having an Eu concentration of 3.6 mol % and which reproduced the same color as the present tube.

EXAMPLE 8

A fluorescent mixture for a fluorescent layer was prepared by a combination of: 37 weight parts of a $Y_2O_2S$:Eu fluorescent material having an Eu concentration of 0.1 mol %; 45 weight parts of a ZnS:Ag fluorescent material exhibiting an emission color (0.147/0.060); and 18 weight parts of a ZnS: Cu/Al fluorescent material exhibiting an emission color (0.282/0.620). By using this fluorescent mixture, a color cathode-ray tube was prepared, which tube had fluorescent elements for blue emission having an emission color (0.217/0.225: light blue). According to this tube, the color unevenness was not visually recognized, brightness was improved by 2%, and the cost of materials was reduced by 24%, as compared with prior art blue emission elements which had an Eu concentration of 3.6 mol % and which reproduced the same color as that of the present elements.

EXAMPLE 9

A fluorescent mixture for a fluorescent layer was prepared by a combination of: 37 weight parts of a $Y_2O_2S$:Eu fluorescent material having an Eu concentration of 0.05 mol %; 45 weight parts of a ZnS:Ag fluorescent material exhibiting an emission color (0.147/0.060); and 18 weight parts of a $Zn_S$: Cu/Al fluorescent material exhibiting an emission color (0.282/0.620). By using this fluorescent mixture, a color cathode-ray tube was prepared, which tube had fluorescent elements for blue emission having an emission color (0.217/0.225: light blue). According to this tube, the color unevenness was not visually recognized, brightness was substantially the same, and the cost of materials was reduced by 16%, as compared with prior art blue emission elements which had a $Y_2O_2S$:Eu fluorescent material having an Eu concentration of 3.6 mol % and reproduced the same color as the present elements.

EXAMPLE 10

A fluorescent mixture for a fluorescent layer was prepared by a combination of: 33 weight parts of a $Gd_2O_2S$:Eu having an Eu concentration of 1.5 mol %; 43 weight parts of a ZnS:Ag fluorescent material exhibiting an emission color (0.147/0.060); and 24 weight parts of a $Zn_S$:Cu/Al fluorescent material exhibiting an emission color (0.282/0.620). By using this mixture, a color cathode-ray tube was prepared, which tube had blue emission elements having an emission color (0.217/0.225: light blue). According to this tube, the color unevenness was not visually recognized, brightness was improved by 2%, and the cost of materials was reduced by 2.5%, as compared with prior art blue emission elements which had a $Gd_2O_2S$:Eu fluorescent material having an Eu concentration of 3.6 mol % and which reproduced the same color as the present elements.

INDUSTRIAL APPLICABILITY

As will be understood by those skilled in the art, the present electron-beam excited display tube is suitable for use as display tubes such as color cathode-ray tubes, monochrome cathode-ray tubes, and low velocity electron-beam excited fluorescent display tubes.

What is claimed is:

1. An electron-beam excited display tube having a fluorescent layer formed from a fluorescent mixture, comprising:
   (i) a red emission component composed of a rare earth oxysulfide fluorescent material containing europium as the main activating component at a europium concentration of 0.05 to 2.0 mol %, wherein the rare earth metal of said oxysulfide is at least one element selected from the group consisting of yttrium, gadolinium, lanthanum and lutetium; and
   (ii) a green emission component whose chromaticity area (X/Y) of the CIE color specification system is defined by the points (0.19/0.76), (0.19/0.45), (0.24/0.41) and (0.39/0.60).

2. The display tube of claim 1, wherein said europium concentration of said red component ranges from 0.05 to 1.5 mol %.

3. The display tube of claim 1, wherein said europium concentration of the red component ranges from 0.1 to 1.0 mol %.

4. An electron-beam excited display tube having a fluorescent layer formed from a fluorescent mixture, comprising:
  (i) a red emission component composed of a rare earth oxysulfide fluorescent material containing europium as the main activating component at a europium concentration of 0.05 to 2.0 mol %, wherein the rare earth metal of said oxysulfide is at least one element selected from the group consisting of yttrium, gadolinium, lanthanum and lutetium;
  (ii) a green emission component whose chromaticity area (X/Y) is defined by the points (0.19/0.76), (0.19/0.45), (0.24/0.41) and (0.39/0.60); and
  (iii) a blue emission component having a chromaticity area (X/Y) defined by the points (0.14/0.045), (0.14/0.19), (0.18/0.025) and (0.18/0.19) of the CIE color specification system, said fluorescent layer being defined by the chromaticity points (0.33/0.63), (0.61/0.36), (0.15/0.17) and (0.18/0.04) of the CIE color specification system.

5. The display tube of claim 4, wherein said europium concentration of said red component ranges from 0.05 to 1.5 mol %.

6. The display tube of claim 4, wherein said europium concentration of the red component ranges from 0.1 to 1.0 mol %.

7. The display tube of claim 4, wherein said fluorescent layer has a chromaticity area (X/Y) surrounded by the points (0.20/0.25), (0.21/0.20), (0.30/0.375) and (0.35/0.325).

8. The display tube of claim 1, wherein said green emission component is a fluorescent material selected from the group consisting of a zinc sulfide material of the formula $ZnS:Cu/Al$, $ZnS:Cu/Au/Al$ or $(Zn/Cd)S:Cu/Al$, a $Zn_2SiO_4:Mn$ fluorescent material, a $ZnS:Ag/Cu$ fluorescent material, a $Gd_2O_2S:Tb$ fluorescent material, an $La_2O_2S:Tb$ fluorescent material, a $Y_3(Al/Ga)_5O_{12}:Ce$ fluorescent material, a $Y_3Al_5O_{12}:Tb$ fluorescent material and a $Y_2O_2S:Tb$ fluorescent material.

9. The display tube of claim 4, wherein said blue emission component is a material selected from the group consisting of a zinc sulfide fluorescent material containing silver as the main activator, a $Y_2SiO_5:Ce$ fluorescent material and a $CaWO_4$ fluorescent material.

* * * * *